Jan. 4, 1944.                D. GREGG                2,338,505
                    PRESSURE REGULATING DEVICE
                       Filed Feb. 13, 1942
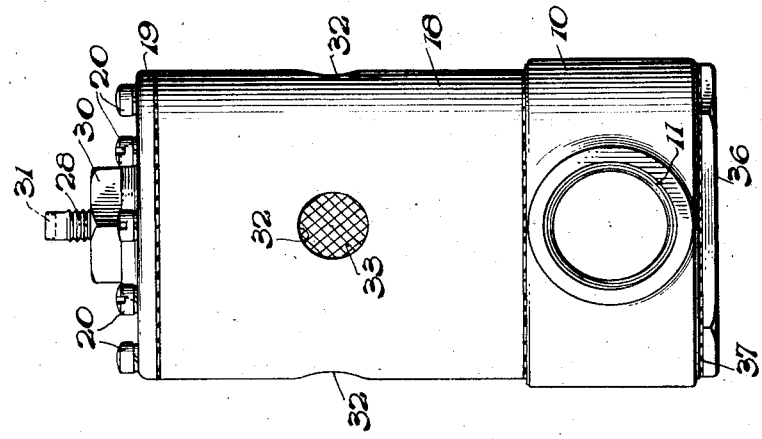
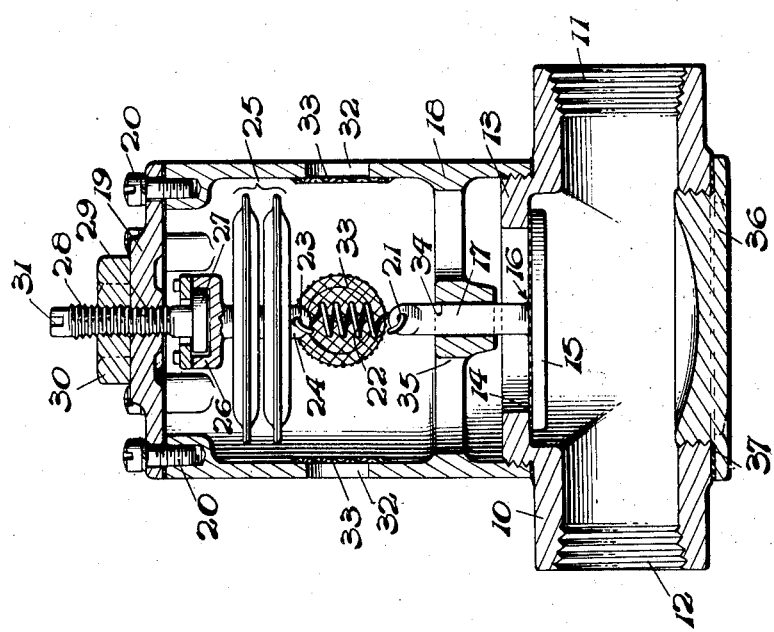
Inventor
David Gregg.
By David F. Doody.
Attorney Patented Jan. 4, 1944

2,338,505

UNITED STATES PATENT OFFICE 2,338,505

PRESSURE REGULATING DEVICE

David Gregg, Caldwell, N. J., assignor to Bendix Aviation Corporation, South Bend, Ind., a corporation of Delaware Application February 13, 1942, Serial No. 430,827

3 Claims. (Cl. 137—153)

This invention relates to pressure regulating systems, and more particularly to valves for the control of air pressure in an aircraft instrument suction line.

It is common practice to employ several different gyroscopic instruments in the navigation of air craft, and usually, these instruments are contained in separate casings on the instrument panel of a cockpit, and are driven by the force of a jet of entering air directed against rotor buckets of the gyro, which force is created by the suction or drawing off of air from the casing through a common line connected to each of the instruments and to the input of an engine-driven suction pump.

Ordinarily, the suction pump is of large capacity, and it has been conventional in the past to so regulate the absolute pressure drop in the suction line that it will not exceed a fixed value, for example, 4" Hg. With this suction pressure at conventional altitudes, the rotors may be maintained at constant rotative speeds on the order of 6,000 R. P. M. This regulation is accomplished by the use of valves of the type shown in the patents to Gregg, 2,194,749, Rylsky, 2,161,531 and Olshevsky, 2,168,536.

The regulation of the suction pressure so that it does not exceed a certain maximum drop is important, since the different gyroscopic instruments will not give constant indications of flight changes when the rotors of the instruments are spinning at a speed appreciably above the speed for which they are designed. Performance specifications of gyro instruments require the maintenance of rotative speeds within a predetermined tolerance, and it has been found that when the instruments are used in flights at the higher altitudes, for example, above 10,000 feet, it becomes increasingly difficult to prevent the rotative speeds of the gyros from exceeding the determined tolerances by means of the valves in common use. The excessive speeds at high altitudes are due to the decrease in windage loss within the casing of the gyro rotor, as the atmospheric pressure at high altitudes, is, of course, very low, and the air density becomes correspondingly low. Of course, the windage losses decrease at all altitudes above sea level, resulting in an increased rotative speed of the gyros, but as the altitudes approach and exceed 10,000 feet, it becomes increasingly difficult to govern the speeds within the tolerances allowed. At the present time, military fighting craft are expected to maintain flight at a limiting altitude in the neighborhood of 45,000 feet, and the airlines have already begun to fly passengers in supercharged cabins at altitudes well above 10,000 feet, but prior to the present invention, no satisfactory means has been found to maintain the gyro rotor speeds within the speed range permitted by service and airline specifications.

It is an object of the present invention to provide a novel regulating valve wherein the regulation is varied with altitude in order to permit predetermined line pressure variations.

It is another object of the invention to provide a regulating valve wherein the regulating effect is varied as a function of altitude or barometric pressure.

Other objects will appear from a study of the following specification when made in conjunction with the attached drawing, throughout which like numerals designate like parts.

Fig. 1 is a sectional view of one embodiment of the present invention; and

Fig. 2 is an elevational view of the embodiment shown in Fig. 1.

In accordance with the present invention, a pressure relief valve for a suction line, and particularly an aircraft instrument suction line, is provided, having resilient means for regulating the pressure differential value, between the suction line and the atmosphere, at which the relief valve is to open and prevent the decrease in pressure in the suction line beyond a predetermined absolute value with respect to the atmosphere, and also, means responsive to changes in atmospheric pressure for varying the absolute pressure differential between the suction line and the atmosphere, in such a manner that at low atmospheric pressures, the differential between the suction line pressure and the atmosphere is considerably less than at high atmospheric pressures.

There is shown at 10, a valve casing having threaded end connections 11 and 12, and an offset or T threaded extension 13 intermediate the ends of casing 10. This extension contains an inwardly disposed circular valve seat 14, upon which is seated a circular head 15 of a valve 16 having a stem member 17 projecting outwardly with respect to the interior of casing 10. A generally cylindrical housing 18 is attached, by inter-fitting screw threads, to the extension 13. Housing 18 has a closure portion 19 attached thereto at its top, by a plurality of screw studs 20. Valve stem 17 is provided with an aperture 21 at its outermost end, to which is secured the end loop of a helical spring 22, having a connection at its other end with an aperture 23 of a lug member 24 welded to a flexible wall of the aneroid unit 25. This unit, which is shown composed of two aneroids mechanically connected in series, is attached, by means of a coupling member 26, to a smooth flange 27 of an adjusting screw 28, which is in engagement with screw threads formed in a central aperture 29 in closure 19. A conventional lock nut 30 is carried upon the threads of screw 28, and a slot or other tool engaging portion 31 is provided in the top of adjusting screw 28.

As will be readily seen from its showing, the connection between coupling 26 and flange 30 is such that screw 28 may be readily adjusted without imparting torsion to the aneroid unit 25, and yet unit 25 and spring 22 may be placed under a variable axial force depending upon the adjustment of screw 28. A plurality of windows 32 is provided in the wall of housing 18, so that the interior of the housing may be open to external or atmospheric pressure. These windows may be covered by conventional mesh screens, as shown at 33. Valve stem 17 is maintained in axial alignment by means of a stem guiding aperture 34 formed within the spider member 35, made integral with the interior wall of housing 18.

A screw stopper 36 is threaded into the bottom of an aperture in casing 10, and a fluid-tight seal between the casing 10 and the stopper 36 is maintained by means of a conventional gasket 37. Stopper 36 is provided so that valve 16 may be easily inserted into casing 10 in the assembly of the unit.

Valve casing 10 may be inserted in an instrument suction line, for example, line 17 of Fig. 6 of the above-identified Gregg patent, by means of suitable connectors in engagement with the end connections 11 and 12. Spring member 22 will have the proper resilience to maintain valve 16 tightly closed until the pressure drop in the suction line exceeds the predetermined maximum, for example, 4" Hg. When the 4" drop is exceeded, spring member 22 will be extended by atmospheric pressure within housing 18, forcing valve head 15 to leave valve seat 14, and admit atmospheric air into the casing 10 to lower the pressure drop in the suction line until it again reaches 4" Hg.

As the craft carrying the valve member of the present invention flies above sea level, the reference of spring 22 is progressively changed; that is, the end loop connected to aperture 23 is moved downwardly, as shown in Fig. 1, because of the expansion of aneroids 25 in the presence of atmospheric pressures lower than the atmospheric pressure at sea level. Thus, in altitudes above sea level, valve 16 will open to reduce the pressure drop in casing 10 at progressively lower values, until, at altitudes on the order of 45,000 feet, valve 16 will open to maintain a pressure drop of about 2" Hg. At altitudes in the neighborhood of 45,000 feet, it has been found that the windage losses in the gyro instrument casings have dropped so low that 2" Hg suction pressure in the suction line is sufficient to maintain the gyro rotors within the speed tolerances permitted for present day gyro instruments.

The single embodiment of the invention which has been utilized as an example thereof is consequently not to be interpreted as a definition of the limits of the invention. The invention is to be limited only by the scope of the present claims.

What is claimed is:

1. A pressure regulating device comprising a casing to be maintained at a pressure below atmospheric, a housing open to atmospheric pressure carried exteriorly of said casing, a valve having a head and a stem, a valve seat within said casing, said valve head being seatable thereon, said valve stem extending outwardly from said casing into said housing, a helical spring having one end connected to said valve stem, an adjusting screw carried in said housing axially of said valve stem and an aneroid unit having one side connected to said adjusting screw and its opposite side connected to said helical spring, said housing being open to atmospheric pressure, whereby, upon changes in atmospheric pressure, the tension of said spring is varied to vary the pressure differential between the atmosphere and said casing.

2. A pressure regulating device comprising a casing to be maintained at a pressure below atmospheric, a valve opening thereinto, a housing open to atmospheric pressure attached to said casing, spring means in said housing attached to said valve to maintain it closed within said casing until a predetermined pressure differential between said casing and the atmosphere has been exceeded, and aneroid means connected between said housing and said spring means for decreasing the stress upon said spring means in response to a reduction in atmospheric pressure.

3. A pressure regulating device comprising a casing to be maintained at a pressure other than atmospheric, a valve controlling the pressure in said casing, spring means operating upon said valve, said spring means having a resilience to maintain said valve closed until a predetermined differential of pressure between the atmosphere and said casing has been exceeded, and means for decreasing the stress upon said spring means in response to the movement of said device to a higher altitude.

DAVID GREGG.